(12) United States Patent
Maxwell

(10) Patent No.: US 6,569,005 B2
(45) Date of Patent: May 27, 2003

(54) ANIMAL SKINNER METHOD AND APPARATUS

(76) Inventor: Willie R. Maxwell, 525 Hwy. 61 North, Natchez, MS (US) 39120

( * ) Notice: Subject to any disclaimer, the term of this patent is extended or adjusted under 35 U.S.C. 154(b) by 0 days.

(21) Appl. No.: 09/847,725

(22) Filed: May 2, 2001

(65) Prior Publication Data

US 2002/0164940 A1 Nov. 7, 2002

(51) Int. Cl.[7] .................................................. A22B 5/16
(52) U.S. Cl. ........................................ 452/128; 452/125
(58) Field of Search ................................ 452/125, 128, 452/185, 187, 193, 194, 132; 294/141, 142; 414/462

(56) References Cited

U.S. PATENT DOCUMENTS

| | | | | |
|---|---|---|---|---|
| 1,189,966 | A | * | 7/1916 | Kellogg ........................ 452/187 |
| 2,931,629 | A | * | 4/1960 | Keller .......................... 254/409 |
| 3,139,260 | A | * | 6/1964 | Hamel .......................... 248/340 |
| 3,789,458 | A | * | 2/1974 | Brown .......................... 452/128 |
| 3,871,084 | A | | 3/1975 | Carrington et al. |
| 3,936,908 | A | * | 2/1976 | Cook ........................... 452/128 |
| 4,317,257 | A | | 3/1982 | Engel |
| 4,529,240 | A | | 7/1985 | Engel |
| 4,806,063 | A | * | 2/1989 | York ........................... 414/462 |
| 5,336,124 | A | | 8/1994 | Garside |
| 5,562,534 | A | * | 10/1996 | McGough ...................... 452/187 |
| 5,643,073 | A | | 7/1997 | Tice |
| 5,791,858 | A | * | 8/1998 | Sasser ......................... 414/462 |
| 5,820,455 | A | * | 10/1998 | Breedlove ..................... 452/187 |
| 5,950,893 | A | * | 9/1999 | Heggeland ..................... 224/578 |
| 6,296,559 | B1 | * | 10/2001 | Kinnebrew .................... 452/128 |

FOREIGN PATENT DOCUMENTS

| | | | | |
|---|---|---|---|---|
| EP | 0598957 | * | 6/1994 | .................. 452/125 |
| FR | 2641947 | * | 7/1990 | .................. 452/125 |

* cited by examiner

*Primary Examiner*—Peter M. Poon
*Assistant Examiner*—D. Parsley

(57) ABSTRACT

There is provided a first cable assembly, a second cable assembly, and a common hook unit connected to the first and second cable assemblies. Each cable assembly includes a cable guide and skin gripper member which includes a plurality of blunt-end gripper bumps. In accordance with another aspect of the invention, a method of removing skin from an animal carcass is provided which includes the steps of: attaching the carcass to a fixed object, such as a tree; splitting the skin from the inside of all four legs and down the stomach of the carcass; attaching a first cable loop assembly to skin of a first leg of the carcass; attaching a second cable loop assembly to skin of a second leg of the carcass; and pulling both cable loop assemblies using a vehicle, whereby the skin is pulled off of the carcass.

5 Claims, 4 Drawing Sheets

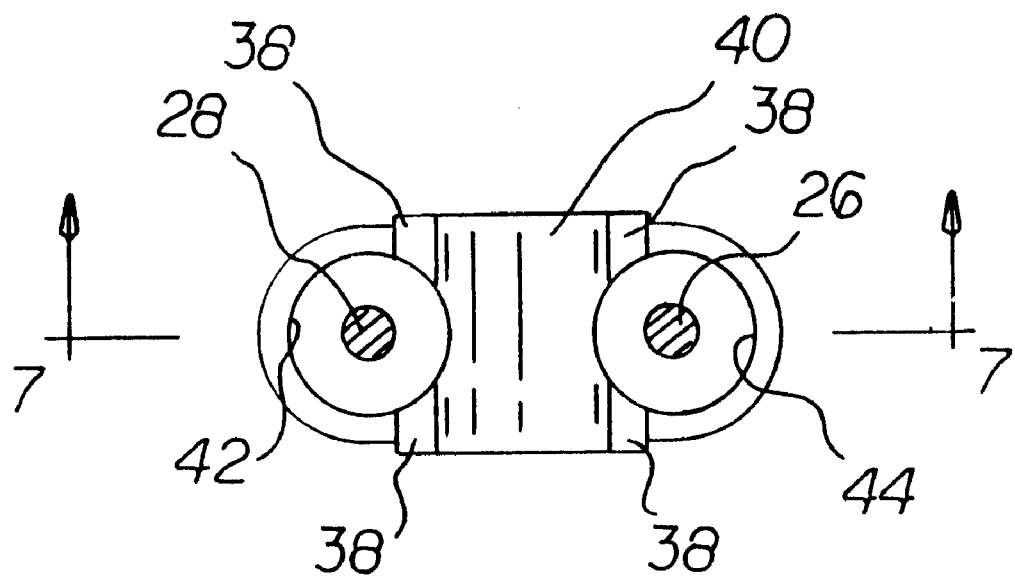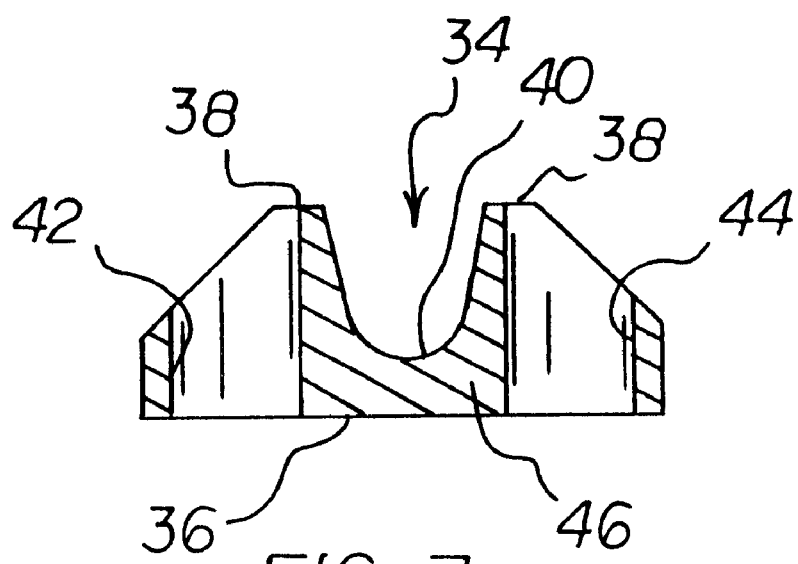

ANIMAL SKINNER METHOD AND APPARATUS

BACKGROUND OF THE INVENTION

1. Field of the Invention

The present invention relates generally to animal skinning devices and, more particularly, to animal skinning devices especially adapted for skinning game animals in the field.

2. Description of the Prior Art

When a game animal, such as a deer, is killed, the skin of the animal is often removed in the field. Most simply and most laboriously, the skin is removed manually. However, throughout the years, a number of innovations have been developed relating skinning game animals in the field utilizing the power of a motor vehicle, and the following U. S. patents are representative of some of those innovations: U.S. Pat. Nos. 3,871,084, 4,317,257, 4,529,240, 5,336,124, and 5,643,073. In each of the above-listed patents, a respective method of skinning is disclosed and a respective apparatus for skinning is disclosed. Each of the respective skinning methods shares some common characteristics. One shared skinning method characteristic is that the respective skin of a carcass is pulled by a vehicle by gripping carcass neck skin at one neck location. Another shared skinning method characteristic is that a single portion of loose skin of a respective carcass is gripped by a single skin gripping device. It has been discovered by the present inventor that it would be desirable, in a skinning method, to grip carcass leg skin for pulling by a vehicle. It has also been discovered by the present inventor that it would be desirable, in a skinning method, to simultaneously grip leg skin on two different legs for pulling by a vehicle.

U. S. Pat. Nos. 3,871,084, 4,317,257, 4,529,240, 5,336,124, and 5,643,073 can also be considered with respect to the apparatuses disclosed therein. More specifically, U. S. Pat. No. 3,871,084 discloses an animal skinning device which includes a skin gripping loop, a first block having a smooth concave surface located opposite to a portion of the skin gripping loop, and a separately tethered anchor block. To avoid the complexities in properly employing a separately tethered anchor block, it would be desirable if an animal skinning device were provided which does not employ such a separately tethered anchor block. Also, to increase skin gripping power of the portion of the block located opposite the skin gripping loop, it would be desirable for a block located opposite a skin gripping loop to have a bumpy surface rather than a smooth surface.

U. S. Pat. No. 4,317,257 discloses the use of multiple loops of flexible cable for gripping skin of an animal carcass. In this respect, gripped skin is completely surrounded by flexible cable material. However, to increase skin gripping power, it would be desirable if a skin gripping device included a rigid gripping member that is located opposite a portion of a flexible skin gripping cable.

U. S. Pat. No. 4,529,240 discloses an animal skinning device, which, like U. S. Pat. No. 3,871,084 discussed above, employs a smooth block surface located opposite a skin gripping loop. As stated above, it would be desirable for a block located opposite a skin gripping loop to have a bumpy surface.

U. S. Pat. No. 5,336,124 discloses an animal skinning device which employs a sharp spike that projects from a rigid gripping block to a flexible gripping loop. Clearly, the sharp spike can cut through the portion of the skin between the loop and the block. As a result, the gripped skin can be torn, and the grip can be reduced. In this respect, it would be desirable if an animal skinning device were provided that includes blunt, non-cutting bumps on the surface of a rigid gripping block located opposite to a gripping loop. Blunt surface bumps would lessen the likelihood of cutting or tearing the gripped skin.

U. S. Pat. No. 5,643,073 discloses a completely rigid gripping member for gripping animal skin. Without any flexible gripping loop present, the effectiveness of skin gripping may be compromised. Therefore, it would be desirable for an animal skinning device to employ both flexible and rigid skin gripping components.

Still other features would be desirable in an animal skinner method and apparatus. For example, multiple skin gripping cable assemblies are pulled by a common winch or vehicle. In this respect, it would be desirable if the multiple cable assemblies were easily connected to a common hook, which in turn is connected to a cable connected to the winch or vehicle. It would also be desirable if the common hook included an easily operated hook lock to prevent cables connected to the hook from slipping off of the hook.

Thus, while the foregoing body of prior art indicates it to be well known to use an animal skinning devices that are attached to vehicles, the prior art described above does not teach or suggest an animal skinner method and apparatus which has the following combination of desirable features: (1) provides gripping of carcass leg skin for pulling by a vehicle; (2) provides simultaneously gripping leg skin on two different legs for pulling by a vehicle; (3) does not employ a separately tethered anchor block; (4) employs a rigid block which has a bumpy skin gripping surface; (5) includes a rigid gripping member that is located opposite a portion of a flexible skin gripping cable; (6) includes blunt, non-cutting bumps on the surface of a rigid gripping block located opposite to a gripping loop; (7) employs both flexible and rigid skin gripping components; (8) provides for multiple cable assemblies to be easily connected to a common hook, which in turn is connected to a cable connected to the winch or vehicle; and (9) provides a common hook which includes an easily operated hook lock to prevent cables connected to the hook from slipping off of the hook. The foregoing desired characteristics are provided by the unique animal skinner method and apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides an animal skinner apparatus which includes a first cable assembly which includes a first cable-to-hook attachment end and a first cable-toskin attachment end. A second cable assembly includes a second cable-to-hook attachment end and a second cable-to-skin attachment end. A common hook unit is connected to the first cable-to-hook attachment end and the second cable-to-hook attachment end. Each of the first cable-to-skin attachment end and the second cable-to-skin attachment end includes an adjustable loop configuration which includes a portion of flexible cable which has a cable end, a loop portion, and a hook-to-loop portion. A cable guide and skin gripper member is connected to the flexible cable. The cable guide and skin gripper member includes an internal side and an external side, and the internal side includes at least one blunt-end gripper bump. An end tip stop member is fixed to the cable end. Preferably, the cable guide and skin gripper member includes a plurality of blunt-end gripper bumps.

The cable guide and skin gripper member includes a central groove. A first cable reception channel is located on one side of the central groove, and a second cable reception channel located on another side of the central groove. Each of the respective cable guide and skin gripper members includes a pair of blunt-end gripper bumps adjacent to the central groove and straddling a respective cable reception channel. Each of the cable guide and skin gripper members includes a base portion, and the blunt-end gripper bumps extend perpendicularly upward from the base portion.

Each of the first cable-to-hook attachment end and the second cable-to-hook attachment end includes a hook attachment loop and a hook loop lock member fixing the hook attachment loop in a locked loop configuration on the common hook unit. The common hook unit includes a hook latch. Preferably, the hook latch is spring loaded.

In accordance with another aspect of the invention, a method of removing skin from an animal carcass is provided which includes the steps of: attaching the carcass to a fixed object; splitting the skin from the inside of all four legs and down the stomach of the carcass; attaching a first cable loop assembly to skin of a first leg of the carcass; attaching a second cable loop assembly to skin of a second leg of the carcass; and pulling both cable loop assemblies from a common hook using a vehicle which is connected to the common hook, whereby the skin is pulled off of the carcass. The fixed object can be a tree. The first and second legs of the carcass can be hind legs. The head of the carcass can be removed prior to pulling on the skin with the vehicle. Also, the first cable loop assembly and the second cable loop assembly include blunt-end gripper bumps that dig into the skin of the carcass when the cable loop assemblies are pulled by the vehicle.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved animal skinner method and apparatus which has all of the advantages of the prior art and none of the disadvantages.

It is another object of the present invention to provide a new and improved animal skinner method and apparatus which may be easily and efficiently manufactured and marketed.

It is a further object of the present invention to provide a new and improved animal skinner method and apparatus which is of durable and reliable construction.

An even further object of the present invention is to provide a new and improved animal skinner method and apparatus which is susceptible of a low cost of manufacture with regard to both materials and labor, and which accordingly is then susceptible of low prices of sale to the consuming public, thereby making such animal skinner method and apparatus available to the buying public.

Still yet a further object of the present invention is to provide a new and improved animal skinner method and apparatus which provides gripping of carcass leg skin for pulling by a vehicle.

Still another object of the present invention is to provide a new and improved animal skinner method and apparatus that provides simultaneously gripping leg skin on two different legs for pulling by a vehicle.

Yet another object of the present invention is to provide a new and improved animal skinner method and apparatus which does not employ a separately tethered anchor block.

Even another object of the present invention is to provide a new and improved animal skinner method and apparatus that employs a rigid block which has a bumpy skin gripping surface.

Still a further object of the present invention is to provide a new and improved animal skinner method and apparatus which includes a rigid gripping member that is located opposite a portion of a flexible skin gripping cable.

Yet another object of the present invention is to provide a new and improved animal skinner method and apparatus that includes blunt, non-cutting bumps on the surface of a rigid gripping block located opposite to a gripping loop.

Still another object of the present invention is to provide a new and improved animal skinner method and apparatus which employs both flexible and rigid skin gripping components.

Yet another object of the present invention is to provide a new and improved animal skinner method and apparatus that provides for multiple cable assemblies to be easily connected to a common hook, which in turn is connected to a cable connected to the winch or vehicle.

Still a further object of the present invention is to provide a new and improved animal skinner method and apparatus that provides a common hook which includes an easily operated hook lock to prevent cables connected to the hook from slipping off of the hook.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 6 is an enlarged cross-sectional view of a portion of the embodiment of the invention shown in FIG. 5 taken along line 6—6 thereof.

FIG. 7 is a cross-sectional view of a portion of the embodiment of the invention shown in FIG. 6 taken along line 7—7 thereof.

DESCRIPTION OF THE PREFERRED EMBODIMENT

Figure 1:
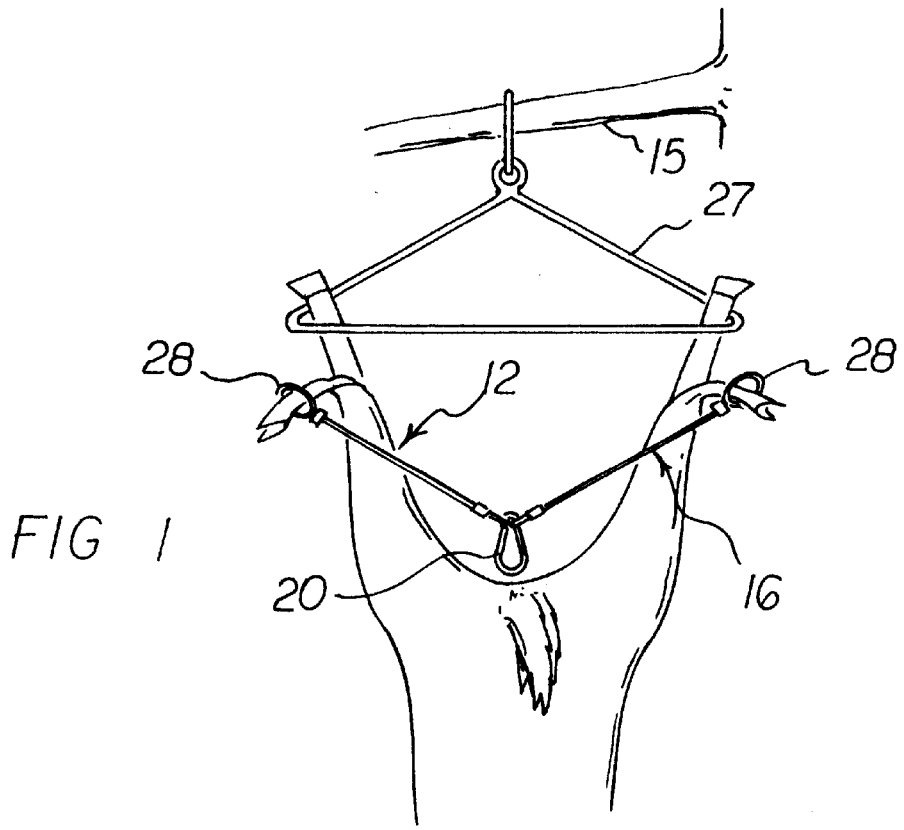
FIG. 1 is a front view showing a preferred embodiment of the animal skinner apparatus of the invention mounted on the skin of two rear legs of an animal, prior to being pulled by a vehicle.
Figure 2:
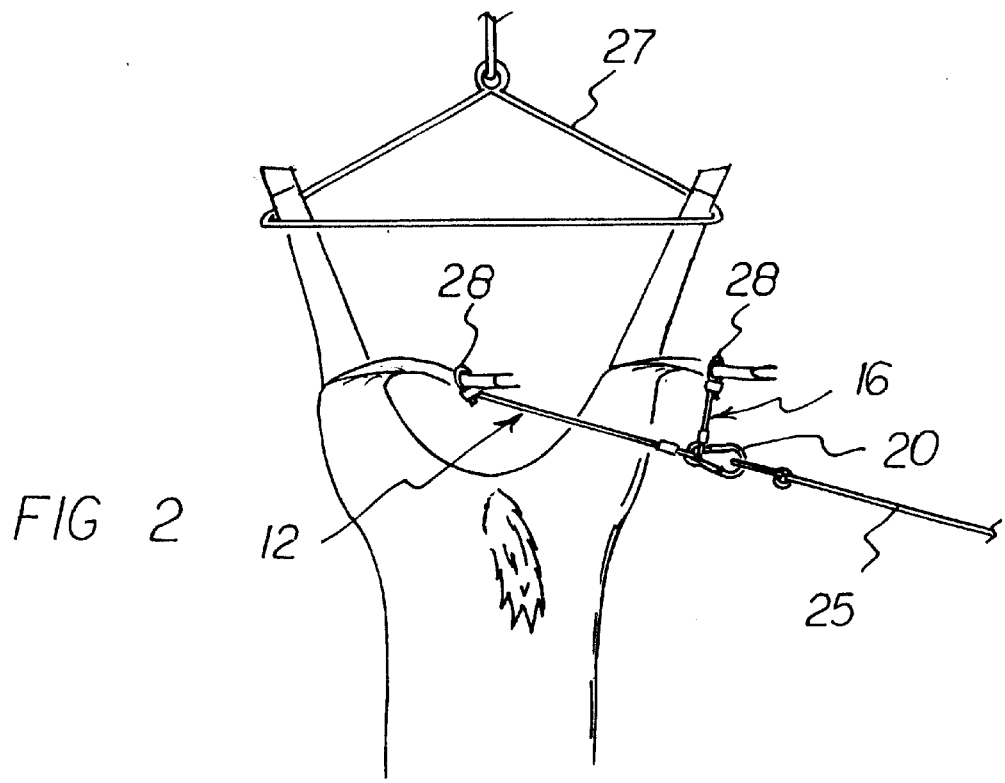
FIG. 2 is a front view of the embodiment of the animal skinner apparatus shown in FIG. 1, being pulled by cable attached to a vehicle (not shown).
Figure 3:
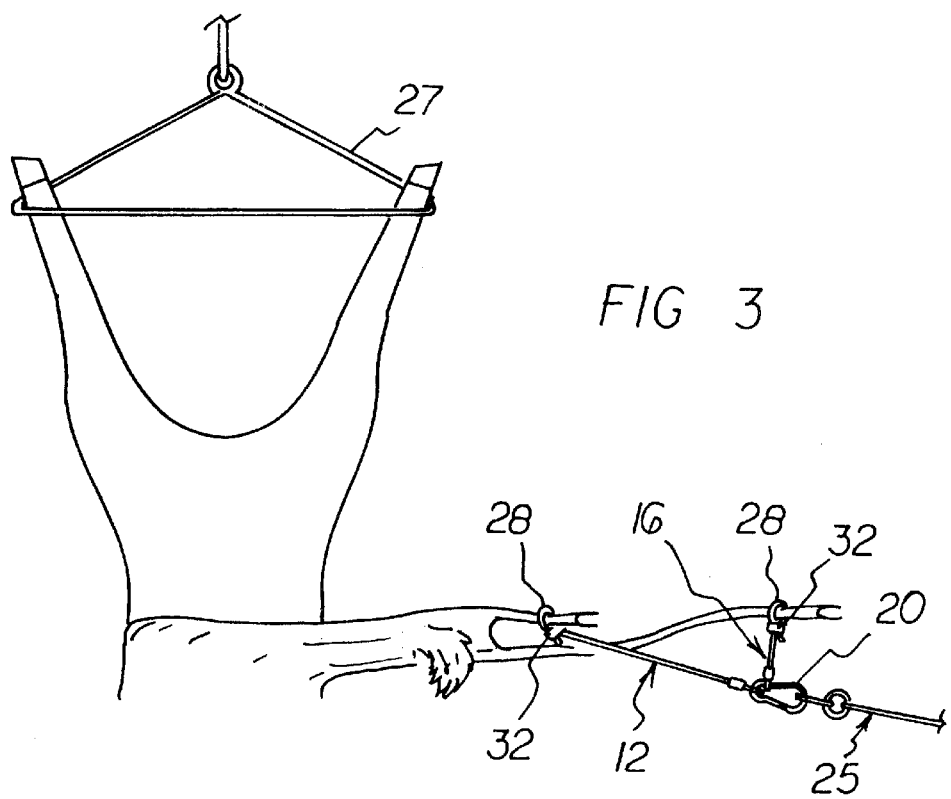
FIG. 3 is a front view of the embodiment of the animal skinner apparatus shown in FIGS. 1 and 2, being further pulled by cable attached to a vehicle (not shown).
Figure 4:
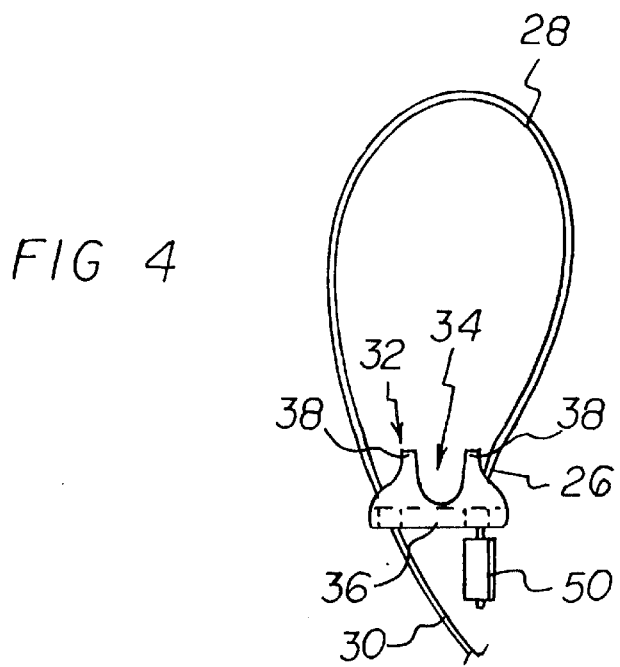
FIG. 4 is a top view of a loop portion of the preferred embodiment of the apparatus of the invention.
Figure 5:
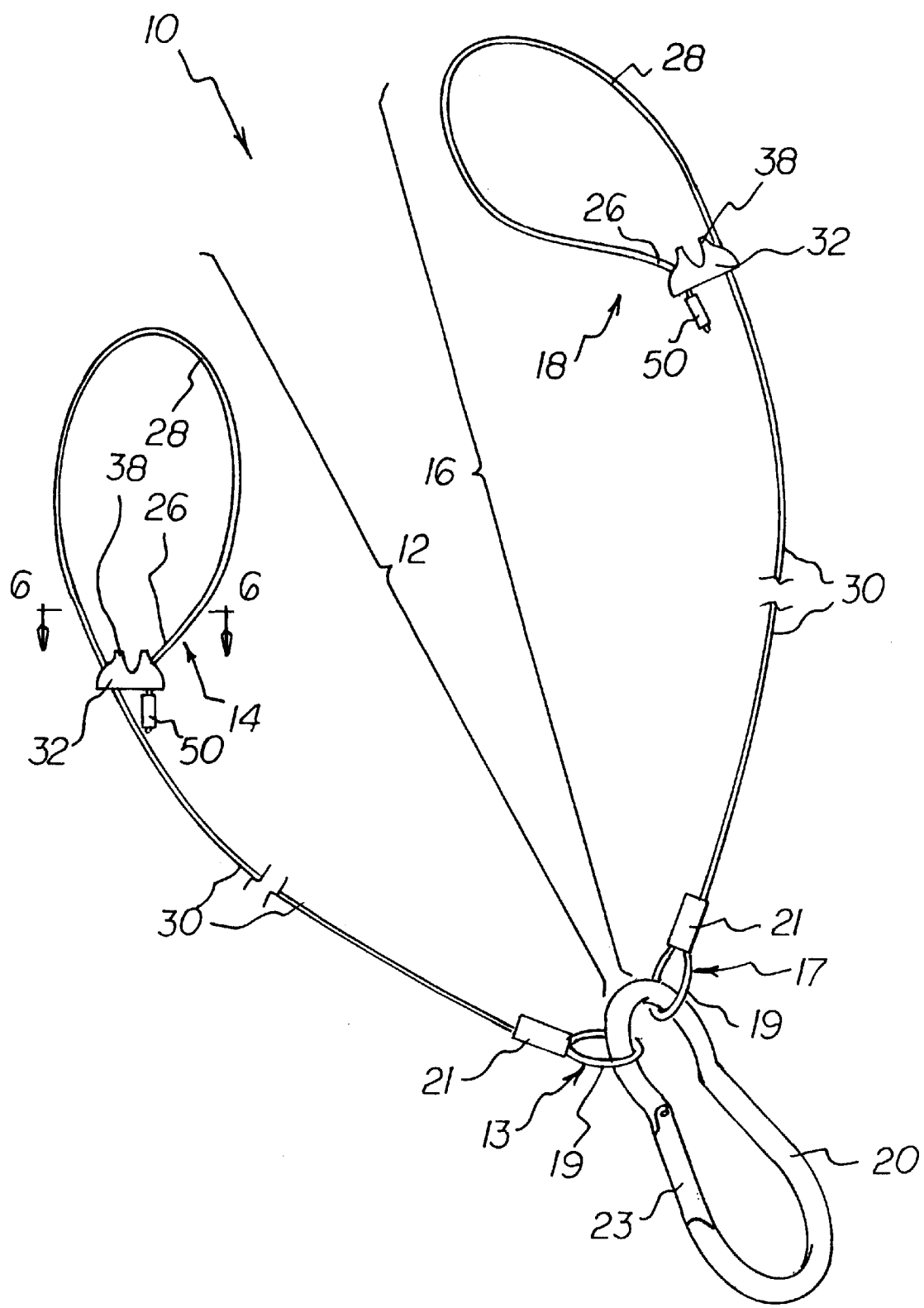
FIG. 5 is a top perspective view of the preferred embodiment of the apparatus of the invention, not attached to an animal or a vehicle.

With reference to the drawings, a new and improved animal skinner method and apparatus embodying the principles and concepts of the present invention will be described.

Turning to FIGS. 1–7, there is shown an exemplary embodiment of the animal skinner method and apparatus of the invention generally designated by reference numeral 10. In its preferred form, animal skinner method and apparatus 10 includes a first cable assembly 12 which includes a first cable-to-hook attachment end 13 and a first cable-to-skin attachment end 14. A second cable assembly 16 includes a second cable-to-hook attachment end 17 and a second cable-to-skin attachment end 18. A common hook unit 20 is connected to the first cable-to-hook attachment end 13 and the second cable-to-hook attachment end 17. Each of the first cable-to-skin attachment end 14 and the second cable-to-skin attachment end 18 includes an adjustable loop configuration which includes a portion of flexible cable which has a cable end 26, a loop portion 28, and a hookto-loop portion 30. A cable guide and skin gripper member 32 is connected to the flexible cable. The cable guide and skin gripper member 32 includes an internal side 34 and an external side 36, and the internal side 34 includes at least one bluntend gripper bump 38. An end tip stop member 50 is fixed to the cable end 26. Preferably, the cable guide and skin gripper member 32 includes a plurality of blunt-end gripper bumps 38.

The cable guide and skin gripper member 32 includes a central groove 40. A first cable reception channel 42 is located on one side of the central groove 40, and a second cable reception channel 44 located on another side of the central groove 40. Each of the respective cable guide and skin gripper members 32 includes a pair of blunt-end gripper bumps 38 adjacent to the central groove 40 and straddling a respective cable reception channel. Each of the cable guide and skin gripper members 32 includes a base portion 46, and the blunt-end gripper bumps 38 extend perpendicularly upward from the base portion 46.

Each of the first cable-to-hook attachment end 13 and the second cable-to-hook attachment end 17 includes a hook attachment loop 19 and a hook loop lock member 21 fixing the hook attachment loop 19 in a locked loop configuration on the common hook unit 20. The common hook unit 20 includes a hook latch 23. Preferably, the hook latch 23 is spring loaded.

Use of the animal skinner apparatus 10 of the invention permits a person to remove the skin (also, hide) from an animal, such as a deer or other game, without manually pulling or tugging on the hide and without straining one's back. To prepare the animal for skinning, in accordance with the invention. A person splits the hide on the inside of all four legs and down the stomach of the animal. On the hind legs, the hide is skinned to above the hocks to approximately 4 inches above the hock leaving the hide attached. Then, the animal is hung by its hind legs using a hanger 27 that is hung from a tree 15 (or other fixed object), as shown in FIG. 1. The head of the animal can be removed, and the hide from the front legs is skinned to above the hocks. Now, the animal is ready to be skinned by the animal skinner apparatus 10 of the invention.

The first cable-to-skin attachment end 14 and the second cable-to-skin attachment end 18 are looped around the respective portions of the hide that are hanging from the hind legs. The respective hook-to-loop portions 30 are pulled so that some of the respective loop portions 28 pass through the respective first cable reception channels 42 so that the remaining loop portions 28 tighten up on the looped around portions. The respective loops are tightened so that the blunt-end gripper bumps 38 of the respective cable guide and skin gripper members 32 dig into the respective hide portions. Also, during tightening of the loops, portions of the hide fill in the respective central grooves 40 of the cable guide and skin gripper members 32. As a result, the respective hide portions are tightly gripped by the respective cable guide and skin gripper members 32.

Then, the first cable-to-hook attachment end 13 and the second cable-to-hook attachment end 17 are attached to the common hook unit 20. This is done by pressing down on the hook latch 23 and threading the respective hook attachment loops 19 onto the common hook unit 20. Also. A vehicle pull cable 25 is threaded onto the common hook unit 20. Then, to lock the first cable-to-hook attachment end 13, the second cable-to-hook attachment end 17, and the vehicle pull cable 25 to the common hook unit 20, the hook latch 23 is released and the internal spring rest the hook latch 23 to the locked position.

Then, the vehicle pull cable 25 is attached to a vehicle (not shown), and the vehicle is driven in a direction away from the animal. As a result, the respective first cable-to-skin attachment end 14 and second cable-to-skin attachment end 18 further tighten on the hide, and the hide is pulled off of the animal. The vehicle can be any of a variety of vehicles includes a car, truck, lawnmower, all terrain vehicle (ATV), and tractor, among others.

The respective cables can be made from steel cables. The end tip stop members 50, the cable guide and skin gripper members 32, the hook loop lock members 21, and the common hook unit 20 can also be made from a strong durable metal such as steel. The end tip stop members 50 and the hook loop lock members 21 can be made from common metal ferrules.

In accordance with another aspect of the invention, a method of removing skin from an animal carcass is provided which includes the steps of: attaching the carcass to a fixed object; splitting the skin from the inside of all four legs and down the stomach of the carcass; attaching a first cable loop assembly to skin of a first leg of the carcass; attaching a second cable loop assembly to skin of a second leg of the carcass; and pulling both cable loop assemblies from a common hook using a vehicle which is connected to the common hook, whereby the skin is pulled off of the carcass. The fixed object can be a tree. The first and second legs of the carcass can be hind legs. The head of the carcass can be removed prior to pulling on the skin with the vehicle. Also, the first cable loop assembly and the second cable loop assembly include blunt-end gripper bumps that dig into the skin of the carcass when the cable loop assemblies are pulled by the vehicle.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved animal skinner method and apparatus that is low in cost, relatively simple in design and operation, and which may advantageously provide gripping of carcass leg skin for pulling by a vehicle. With the invention, an animal skinner method and apparatus provides simultaneously gripping leg skin on two different legs for pulling by a vehicle. With the invention, an animal skinner method and apparatus is provided which does not employ a separately tethered anchor block. With the invention, an animal skinner method and apparatus is provided which employs a rigid block which has a bumpy skin gripping surface. With the invention, an animal skinner method and apparatus is provided which includes a rigid gripping member that is located opposite a portion of a flexible skin gripping cable. With the invention, an animal skinner method and apparatus is provided which includes blunt, non-cutting bumps on the surface of a rigid gripping block located opposite to a gripping loop. With the invention, an animal skinner method and apparatus is provided which employs both flexible and rigid skin gripping components. With the invention, an animal skinner method and apparatus provides for multiple cable assemblies to be easily connected to a common hook, which in turn is connected to a cable connected to the winch or vehicle. With the invention, an animal skinner method and apparatus provides a common hook which includes an easily operated hook lock to prevent cables connected to the hook from slipping off of the hook.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U. S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. An animal skinner apparatus, comprising:
   a first cable assembly which includes a first cable-to-hook attachment end and a first cable-to-skin attachment end,
   a second cable assembly which includes a second cable-to-hook attachment end and a second cable-to-skin attachment end, and
   a common hook unit connected to said first cable-to-hook attachment end and said second cable-to-hook attachment end,
   wherein each of said first cable-to-skin attachment end and said second cable-to-skin attachment end includes an adjustable loop configuration which includes a portion of flexible cable which has a cable end, a loop portion, and a hook-to-loop portion, and a cable guide and skin gripper member connected to said flexible cable, and
   wherein said cable guide and skin gripper member includes:
      a base portion,
      a central groove on said base portion,
      a first cable reception channel located on one side of said central groove, and
      a second cable reception channel located on another side of said central groove,
      a pair of blunt-end gripper bumps,
      said first cable reception channel passing through said base portion on one side of said central groove and having an imaginary central axis perpendicular to said base portion,
      said second cable reception channel passing through said base portion on said another side of said central groove having an imaginary central perpendicular to said base portion,
      and wherein said pair of blunt-end gripper bumps extend perpendicularly upward from said base portion parallel to the imaginary central axes of said first and second cable reception channels and between said first cable reception channel and said second cable reception channel on either side of said central groove, respectively.

2. The apparatus of claim 1, further including:
   an end tip stop member fixed to said cable end.

3. The apparatus of claim 1 wherein each of said first cable-to-hook attachment end and said second cable-to-hook attachment end includes:
   a hook attachment loop, and
   a hook loop lock member fixing said hook attachment loop in a locked loop configuration on said common hook unit.

4. The apparatus of claim 1 wherein said common hook unit includes a hook latch.

5. The apparatus of claim 4 wherein said hook latch is spring loaded.

* * * * *